ELECTRONIC TRANSLATING MEANS

Filed June 30, 1958 4 Sheets-Sheet 1

INVENTOR.
*Robert Betts* by *Ralph R Barnard*
ATTORNEY

June 26, 1962 R. BETTS 3,041,598

ELECTRONIC TRANSLATING MEANS

Filed June 30, 1958 4 Sheets-Sheet 2

ELECTRONIC TRANSLATING MEANS

Filed June 30, 1958 4 Sheets-Sheet 3

June 26, 1962 R. BETTS 3,041,598

ELECTRONIC TRANSLATING MEANS

Filed June 30, 1958 4 Sheets-Sheet 4

3,041,598

ELECTRONIC TRANSLATING MEANS

Robert Betts, Vestal, N.Y., assignor to International Business Machines Corporation, New York, N.Y., a corporation of New York Filed June 30, 1958, Ser. No. 745,552
15 Claims. (Cl. 340—347)

The present invention relates to electromechanical devices and more particularly to an improved means for converting analog position information to electrical digital information in coded form.

In the telemetering and electronic computer fields, it is often desirable to convert a mechanical position, representing an analog, into electronic digital information wherein each bit position of a selected code is in binary form. It is the means for providing such conversion that the present invention is particularly concerned. A mechanical motion of either the rectilinear, linear, curvilinear, or angular type may be represented by an instantaneous position which it is desired to convert to coded electrical information. Even though, for purposes of illustration, the particular device disclosed hereinbelow is described in terms of converting angular information represented by a shaft position into electrical binary information, it is intended that the teachings of the present invention be applicable to each type of motion.

One approach utilized in the prior art for converting a shaft position to electrical digital information is known as a brush, electrically coded shaft digitizer. These brush shaft digitizers utilize plural coded discs mounted along a shaft whose angular position is of interest, the arrangement of the electrical code on each disc and the number of discs being determined by the number of significant digits which it is desired that the electrical digital information contain. Using this technique, each electrically coded disc is composed of conducting segments with a pattern which is dependent upon the particular digital code and order of significance with which the segment is to correspond. The hub of each of the discs is energized and a plural electrical pickup system is used to detect the instantaneous code contained on each disc. While this technique in many instances has provided satisfactory operation and sufficient accuracy, it has several distinct disadvantages. For example, the brushes, which wipe the conductor and insulation portions on the face of the disc, are subjected to a high degree of wear by reason of the amount of pressure that must be maintained to provide a reasonable level of contact resistance and the high rotational velocities often required. Furthermore, because the contact resistance cannot be maintained at a constant level during the wiping action, considerable objectionable electrical noise is generated on the output of the brushes. This additional noise often provides electrical problems in the readout. Moreover, there are some practical applications where shaft digitizers are much too bulky to be compatible with design requirements.

In addition to brush type electrical shaft digitizers, another known type of analog shaft to electrical digital information converter uses discs containing a selected arrangement of apertures. To provide a means of sampling the instantaneous position thereof, a stationary high frequency radiation source and high frequency radiation detecting means are positioned on opposite sides of each disc. While such conversion techniques have the substantial advantage in that they do not utilize brushes, they require considerably more volume in mechanization than can normally be tolerated in computer and telemetering applications.

It is, therefore, a primary object of the present invention to provide a new and improved means for converting mechanical analog position information to electrical digital information.

It is another object of the present invention to provide a new and improved means for converting a shaft position commensurate with analog to electrical digital information.

It is still another object of the present invention to provide a new and improved brushless means for converting a mechanical analog position to electrical digital information.

It is an additional object of the present invention to provide a new, improved and compact means for converting a mechanical analog position to electrical digital information wherein each digit position is represented in a binary form.

It is another object of the present invention to provide a new and improved means for converting an analog shaft position to electrical binary information without generating electrical noise.

It is still another object of the present invention to provide a new and improved magnetic brushless means for converting a mechanical analog shaft position to electrical digital information utilizing a non-ambiguous readout.

Other objects of the invention will be pointed out in the following description and claims and illustrated in the accompanying drawings, which disclose, by way of examples, the principle of the invention and the best mode which has been contemplated of applying that principle.

In the drawings:

FIG. 1*a* shows a magnetic horseshoe-shaped core device in accordance with the present invention with an armature means bridging its open leg portions;

FIG. 1*b* shows a magnetic horseshoe core device according to the present invention when an armature means is not bridging its open leg portions;

FIG. 1*c* shows a magnetic horseshoe-shaped core device according to the present invention when an armature means is not bridging its open end portions and it has been acted on by a pulse in its primer winding;

FIG. 1*d* shows a magnetic horseshoe-shaped core device according to the present invention when an armature means is not bridging its open leg portions and it has been acted on by a pulse in its driver winding;

Figure 4:
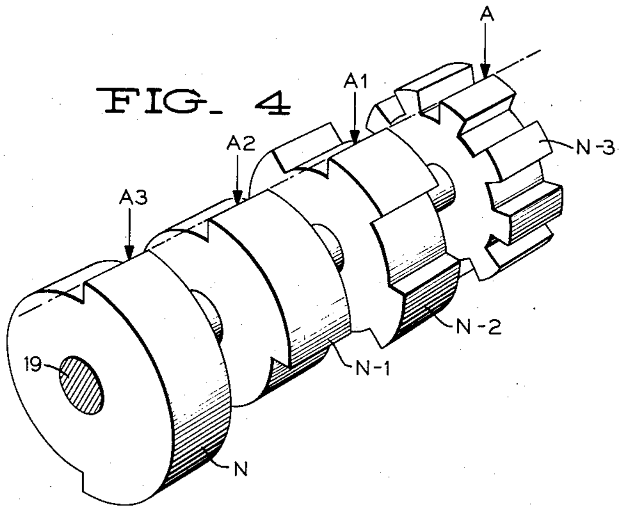
FIG. 4 shows plural tooth discs co-operating with plural magnetic core devices illustrated symbolically.
Figure 6:
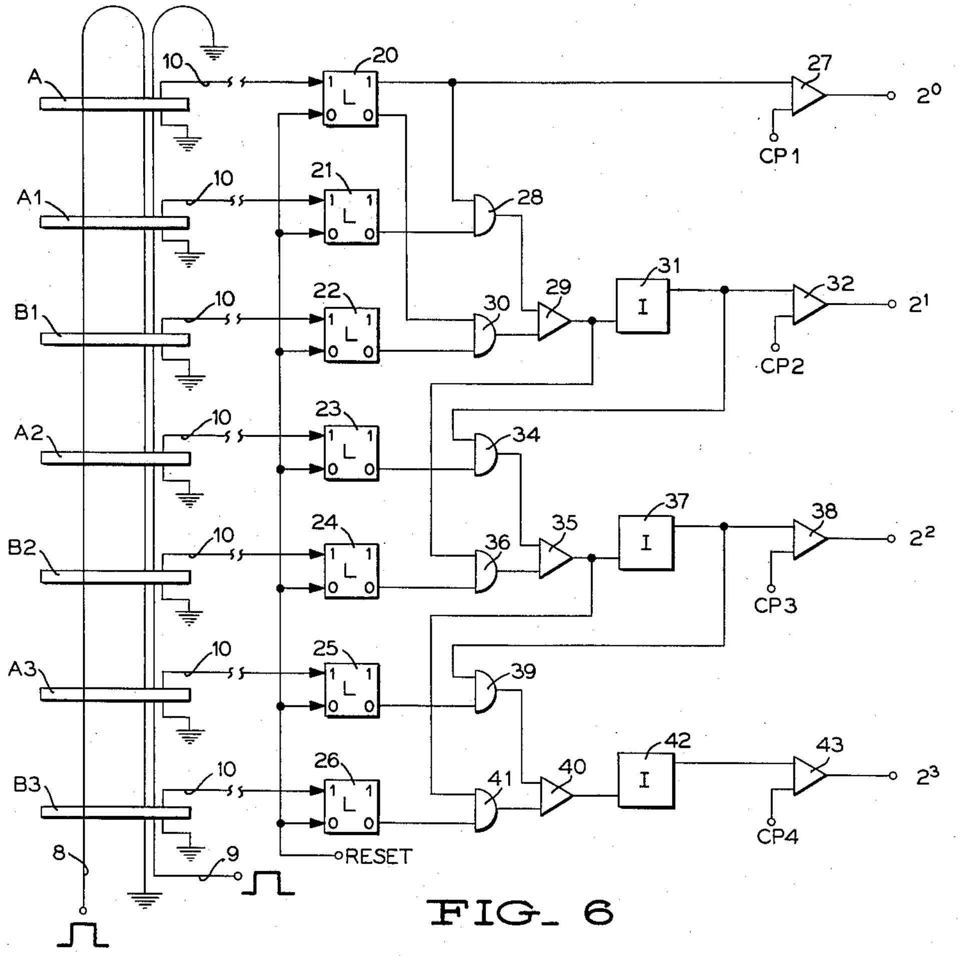
Figure 7A:
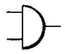
Figure 7B:
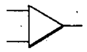
Figure 7C:
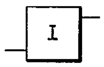
Figure 7D:
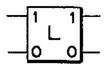

FIGS. 5*a*, 5*b*, 5*c* and 5*d* show the arrangement of dual magnetic core devices with the plural tooth discs of FIG. 4 in order to provide a non-ambiguous readout;

FIG. 6 shows exemplary logic circuitry which may be utilized in combination with the dual core devices to provide non-ambiguous electrical binary information; and FIGS. 7*a*, 7*b*, 7*c* and 7*d* illustrate conventional symbology used in the logic circuit of FIG. 6.

In the description of the drawings, as set forth hereinafter, similar reference numerals refer to similar parts.

Briefly, this invention relates to a mechanical analog position to binary electrical information converter utilizing one or more horseshoe-shaped core devices of a magnetizable material having two open ends. Further means are utilized to provide a magnetizing force in each core. When a low reluctance armature means is positioned to bridge the open ends of a horseshoe-shaped core, the magnetic condition of the core represents one binary condition. However, when the low reluctance armature means is positioned so it will not bridge the two open ends of the core, its magnetic condition represents the other binary condition. If an aperture is made in said horseshoe-shaped core, an inductive sampling means may be passed therethrough for the purposes of determining whether or not the low reluctance armature means is bridging the open ends of the horseshoe-shaped core. The magnetic position detecting device, as described, is extremely useful in providing means for converting analog information represented by a shaft position to electrical digital information in the form of a binary code. However, it will be apparent that the invention is equally applicable to detecting the position of devices having the other types of motion previously described and producing the digital information in other coded forms such as binary-coded decimal, reflected, quinary, biquinary, etc. Plural armature means may be mounted along a shaft with the number of separate armature means corresponding to the number of digital orders of significance desired in the binary electrical output information. The armature means for the highest order of significance should then comprise a disc with a single low reluctance tooth disposed around 180° of its circumference and the armature means for each succeeding lower order of significance should have twice as many low reluctance teeth as the next higher order of significance with the sum of all the tooth widths being equal to 180° of circumference. At least one horseshoe shaped core detection device is then arranged to co-operate with the armature for each order of significance so as to provide a binary electrical output from the inductive sampling means passing through each aperture in accordance with the instantaneous shaft position.

Figure 1A:
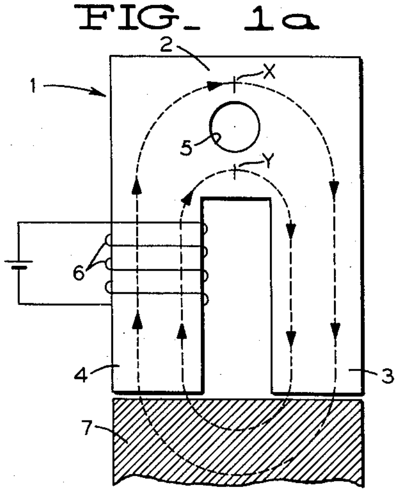

Referring to FIG. 1*a*, there is shown a horseshoe-shaped core device 1 comprising a connecting portion 2 and two leg portions 3 and 4. For purposes of the present invention, an aperture 5 may be punched through the horseshoe-shaped core device. Although the exact location of the aperture is not critical, the area of the cross-section of the core on each side of the aperture must be equal. By way of example, the aperture 5 is shown located in the connecting portion 2. Moreover, in order to set up a reference level of flux density within core 1, a premagnetization winding 6 is wound around one of the leg portions, as shown, and connected to a direct current source. As shown in FIG. 1*a*, when winding 6 is wound on leg portion 4 and energized by a source of sufficient magnitude and with the polarity shown, core 1 may be saturated in the clockwise direction provided that a low reluctance armature means 7 is in registry or in bridging relationship with the face of leg portions 3 and 4. As a result, points X and Y of interest within the core 1 and adjacent to aperture 5 are then placed in a highly saturated condition with the flux passing therethrough in the same direction.

Figure 2:
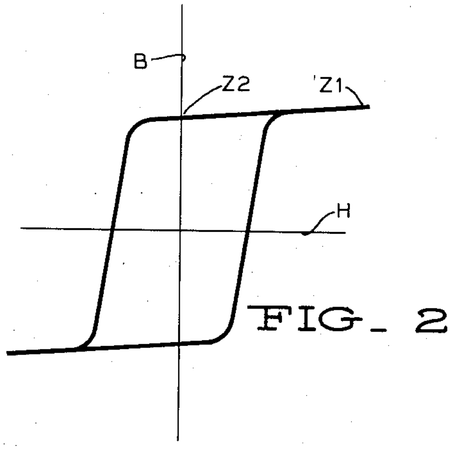
FIG. 2 represents an exemplary hysteresis loop for a square loop magnetizable material which will be helpful in describing the present invention.
Figure 5A:
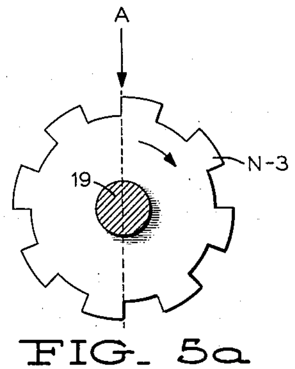
Figure 5B:
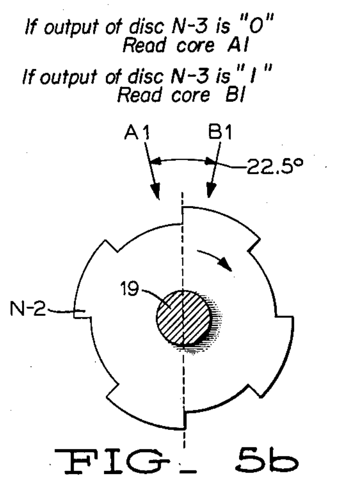
Figure 5C:
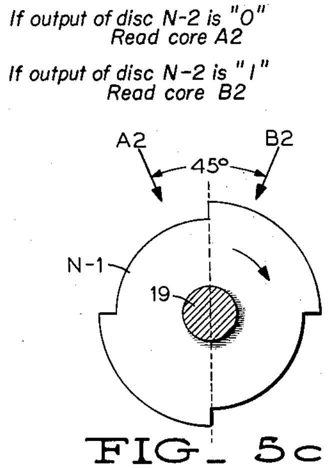
Figure 5D:
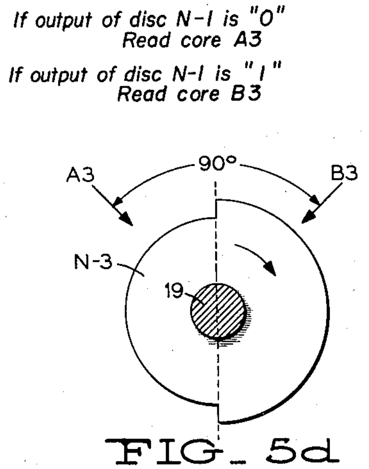

It is important to the utilization of the teachings of the present invention that the core be made of material of the square loop type as exemplified by ferrite. As is known to those skilled in the art, a hysteresis loop may be utilized to depict the flux density within any selected flux path for various magnitudes and polarities of magnetizing force acting on the selected flux path. By way of example, an exemplary hysteresis loop is shown in FIG. 2 as a plot of flux density B versus magnetization force H. As indicated above, the magnetizing force provided by winding 6 places the flux at points of interest X and Y within core 1 in a highly saturated condition when the low reluctance armature means 7 is in bridging relationship with the face of leg portions 3 and 4. Such a condition might be illustrated for each flux path by a hysteresis loop similar to that shown in FIG. 2. Point Z1 may be considered as an illustration of the highly saturated condition existing at points of interest X and Y.

Figure 1B:
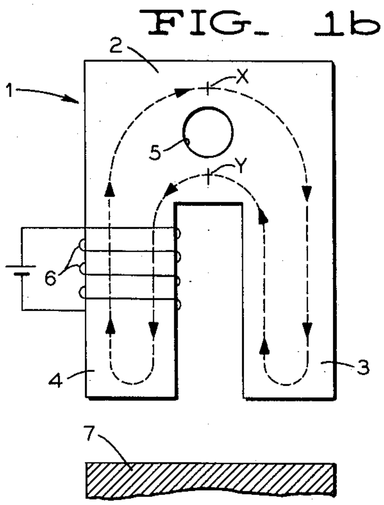

When, however, the low reluctance armature means 7 is moved from its position of registry with or bridging of the open end portions 3 and 4, as shown in FIG. 1*b*, the flux path shown in FIG. 1*a* is no longer possible inasmuch as the magnetizing force provided by winding 6 is not sufficient to pass the flux across the air gap between leg portions 3 and 4. As a result, a flux path folds back upon itself in the manner shown in FIG. 1*b*. The flux path passing through each point of interest could then be represented by a hysteresis loop similar to that shown in FIG. 2, except that the flux density would no longer be in the saturated condition as approximately illustrated by point Z1 but would have decreased to a remanent condition similar to that illustrated by point Z2. As the description proceeds, the importance to the operation of the disclosed embodiment of the present invention of the fact that the flux within the core has this flux density remanent condition will be made clear.

Referring to FIGS. 1*a* and 1*b*, it will be noted that the direction of the flux at point of interest X remains the same regardless of whether armature means 7 bridges the face of leg portions 3 and 4; whereas the direction of the flux at point of interest Y switches from a clockwise direction during the bridging condition to a counterclockwise direction during the non-bridging condition. Accordingly, core 1 may be considered to have two conditions in terms of the flux paths which pass through points X and Y, depending upon whether the low reluctance armature means 7 bridges leg portions 3 and 4. As will be described more fully hereinafter, these two conditions may be utilized to represent either a binary 1 when the low reluctance armature means does not bridge the leg portions or a binary 0 when the armature means does bridge the leg portions or vice versa.

Figure 1C:
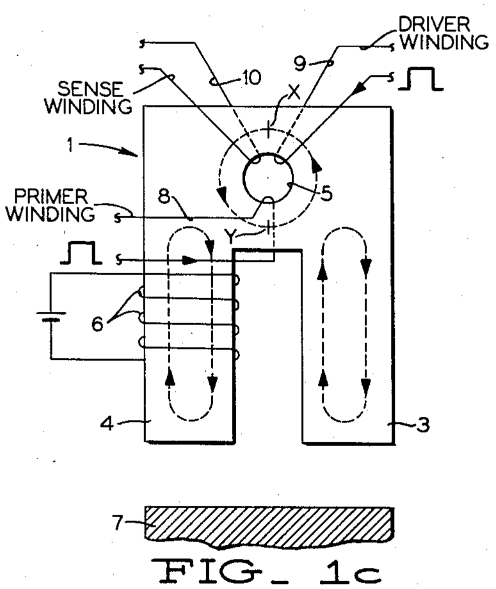

In order that these two magnetic conditions be utilized to describe binary information, it is necessary that further sampling means be provided to detect which of these magnetic conditions exists. Referring to FIG. 1*c*, three windings are passed through aperture 5 for this purpose. One winding 8 may be functionally described as a primer, and the other winding 9 may be functionally described as a driver. A third winding 10 may be described as a sense winding. Furthermore, primer winding 8 is shown connected to a pulse source so as to pass a current pulse in the direction shown by the arrow. Driver winding 9 is shown connected to a pulse source to pass a current pulse in the direction shown by the arrow. It is important that the magnetomotive force pulses provided by primer winding 8 and driver winding 9 be of opposite polarities with reference to aperture 5.

When the low reluctance armature means 7 is not bridging leg portions 3 and 4, as shown in FIG. 1*b*, a current pulse applied to primer winding 8 in the direction shown by the arrow will reverse the direction of the magnetic flux at point Y from the positive remanent condition described above to a negative remanent condition. FIG. 1*c* illustrates the resulting flux path around aperture 5 and through points of interest X and Y.

Figure 1D:
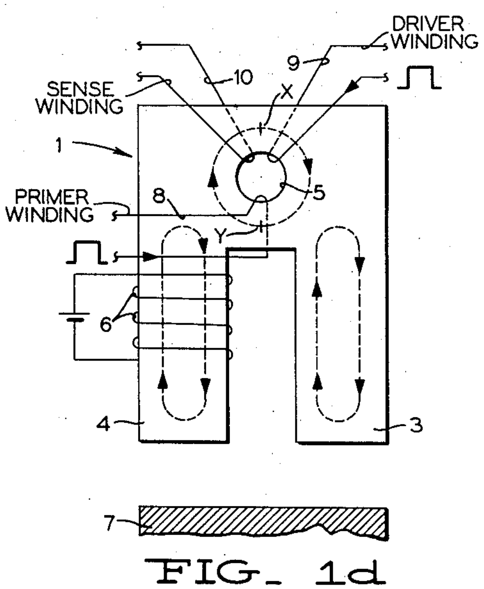

Since there was a negative flux change in the portion of the core around aperture 5, the sense winding 10 will then receive a positive induced voltage detecting the change of direction of flux. Further, if a current pulse is applied to driver winding 9 in the direction shown by the arrow, the flux at points X and Y will be reversed, as shown in FIG. 1*d*. As a result of the positive change of direction of the flux around aperture 5, a negative going voltage pulse is induced in sense winding 10. In summary, when the leg portions 3 and 4 are not bridged by the low reluctance armature means 7, successive current pulses passing through primer winding 8 and drive winding 9, respectively, provide positive and negative going voltage pulses in the sense winding 10. Such a condition for the core device 1, corresponding to the instantaneous position of armature means 7, may be utilized to represent one binary condition.

As will be obvious, only one of the induced voltage pulses in sense winding 10 resulting from the successive pulsing of the primer and drive winding is necessary to detect this binary condition; and therefore, either one of the induced voltage pulses may be ignored in the provision of an electrical binary output. It is emphasized, however, that it is necessary that the direction of the flux around aperture 5 must be changed during each detection operation in order to provide an induced voltage in the sense winding 10. Restated, the exemplary method utilized herein for assuring a satisfactory detection operation is to drive the flux at points of interest X and Y in core 1 to a negative remanent condition by applying a current pulse to primer winding 8 in the direction shown by the arrow each time and prior to the application of a current pulse to driver winding 9 in the direction shown by the arrow. In summary, the position of a low reluctance armature means, which may be defined as the binary "1" condition, is that condition where it does not bridge the open ends of leg portions 3 and 4.

If, however, armature means 7 is bridging leg portions 3 and 4 of core 1, both points X and Y will be in a positive saturation condition corresponding to the clockwise flux path shown in FIG. 1*a*. A current pulse applied to primer winding 8 in the direction shown by the arrow will not change the flux at points X and Y and no voltage will be induced in sense winding 10. Furthermore, a current pulse applied to driver winding 9 will not change the direction of flux at points X and Y of core 1 nor provide an induced voltage in sense winding 10, since core 1 is already saturated in the direction in which these pulses are tending to change the flux. Thus, the position of low reluctance armature means 7, which may be defined as the binary "0" condition, is that condition where it bridges the open ends of leg portions 3 and 4 and neither a pulse on primer winding 8 nor driver winding 9 will induce a voltage in sense winding 10.

As described above, armature means 7 has only two positions with respect to leg portions 3 and 4 of core 1. It is either bridging leg portions 3 and 4 and then providing a low reluctance path therebetween or not bridging them and not providing a low reluctance path therebetween. As described, the horseshoe-shaped core device, of square looped magnetizable material, thus provides a two-state mechanical to electrical transducer device. This two state device is determined by the position of armature means 7 and may be utilized to detect changes in either the linear angular, rectilinear or curvilinear position of armature means 7, as desired.

As suggested above, this horseshoe-shaped device with related circuitry has particularly desirable capabilities in the conversion of analog information in the form of a shaft position to digital electrical information based on the binary code.

The selection of square loop magnetizable material for the core device 1 is based on the high remanent condition of these materials. This high remanent condition maintains high internal magnetic forces within the core so that the change of the flux condition within the core from that shown in FIG. 1*a* (representing one binary condition) to that shown in FIG. 1*b* (representing the other binary condition) is made very quickly and sharply when the armature means has moved from its bridging relationship with the leg portions 3 and 4 of the core. As will be obvious to those skilled in the art, the definition of bridging relationship will be dependent upon the design of the total flux path including the horeshoe-shaped core device 1, the armature means and the pre-magnetization magnetomotive force provided.

Figure 3:
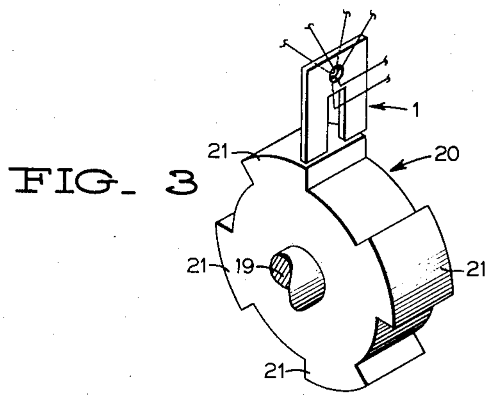
FIG. 3 shows an exemplary armature means positioned in accordance with an analog shaft position co-operating with the magnetic core device according to the present invention.

Referring to FIG. 3, there is shown an armature means mounted on a shaft 19 comprising a disc 20 with four raised or tooth portions 21 equally spaced around its periphery. These raised or tooth portions 21 are functionally identical to the armature means 7 referred to hereinabove in connection with FIGS. 1*a*, 1*b*, 1*c* and 1*d* and may likewise be made of any low reluctance material. While only the tooth or raised portions of the disc need to be made of the low reluctance material, the entire disc or any other portion thereof may be so constructed. Obviously, the space between the teeth may be filled with a suitable high reluctance material in order that a smooth surface is presented to the sensing device. Of essence to the invention is that during one time a low reluctance path is provided across the gap of the sensing device and, at another time, a high reluctance path is provided. A magnetic horseshoe-shaped device 1 with an inductive sampling means as described hereinabove is co-operatively positioned adjacent to the disc 20. Thus, if shaft 19 were to rotate, magnetic horseshoe-shaped device 1 would alternately be placed in a binary "1" condition when a tooth 21 bridges its leg portions 3 and 4 and a binary "0" condition when a tooth does not bridge leg portions 3 and 4. As shown in FIG. 3, since there are four teeth on disc 20, magnetic horseshoe-shaped device 1 will cycle through its binary conditions four times for every complete revolution of shaft position 19. The magnetic horseshoe-shaped device 1 may be electrically interrogated by the inductive sampling means passed through aperture 5, as described hereinabove, to provide either a pulse or no pulse, depending upon the instantaneous position of shaft 19.

As has been indicated, the teachings of the present invention have particularly desirable capabilities in the conversion of analog information in the form of shaft position to digital electrical information based upon the binary code. For example, more than one disc may be affixed along shaft 19 as illustrated in FIG. 5. Therein, a number of discs should correspond to the number of digital orders of significance with which it is desired that the position of shaft 19 be determined. The disc corresponding to the highest or N order of digital significance should have a single tooth of low reluctance material disposed around 180° of its circumference. Similarly, the disc corresponding to the next higher order of digital significance should have two teeth of low reluctance material equally spaced around its circumference of an equal width such that the total width of the two teeth is 180° of circumference. Likewise, the discs corresponding to the N–2 order of digital significance should have four teeth of low reluctance material equally spaced around its circumference, each of an equal width such that the total width of the four teeth totals 180° of circumference. In addition, the discs corresponding to the N–3 order of significance should have eight teeth of low reluctance material equally spaced around its circumference, each of an equal width such that the width of the eight teeth totals 180° of circumference. As will be obvious, the number of discs and corresponding number of digital orders of significance utilized in the determination of the position of shaft 19 is a matter of choice and the particular accuracy requirements with which the designer is concerned.

In FIG. 4, the horseshoe-shaped magnetic core device is symbolically shown in co-operative relationship with each of the discs N, N–1, N–2 and N–3 to provide for the detection of either a binary "1" or binary "0" condition for each disc in the manner described hereinabove. Since the four symbolically shown magnetic core devices A, A1, A2 and A3 are shown in angular alignment with respect to the shaft 19, their instantaneous binary condition, as simultaneously sampled by the sampling means passing through the aperture on each, should define the instantaneous shaft positon in binary electrical information to four orders of significance. It will be apparent that the teeth need not be aligned in the manner shown in FIG. 4. However, the sensing devices for each disc should be angularly oriented with respect thereto so that whatever the alignment of the teeth on the discs, a meaningful ouput as to shaft position will be produced.

The technique of the present invention is of particular usefulness because no physical contact is required between the magnetic horseshoe-shaped core devices 1 and their corresponding tooth disc. As a result, because of the lack of physical contact, there is no wear of the brushes similar to that which has been found objectionable in brush type shaft digitizers of the prior art. Furthermore, because no variable contact resistance exists in the magnetic horseshoe-shaped core device of the present invention, the objectionable electrical noise generated by the brushes of the prior art shaft digitizers is also avoided. It is of particular significance that the improved magnetic shaft digitizing means, according to the present invention, avoids the shortcomings of the prior art electrical contact brush type shaft digitizer in a manner which provides a non-destructible readout. For example, if shaft 19 of FIG. 4 were to stay in one position between simultaneous sampling of the flux condition in each of the magnetic horseshoe-shaped core devices, each successive sampling will provide an identical electrical pulse readout. This is based upon the operation of the sampling means passing through the aperture 5 of each magnetic core device, as described hereinabove.

Referring again to FIG. 4, the number of teeth on each disc was determined by the order of significance of the binary output information which that disc was to provide in co-operation with a magnetic horseshoe-shaped core device. However, as in brush type shaft digitizers, it is equally possible to make the number of teeth (or conductor pattern) the same for each disc by using mechanical gearing between each disc so that the velocity of rotation of each disc is double (binary weighted) the rotational velocity of the disc corresponding to the next higher order of binary significance. It should be clear that the teachings of the present invention would be equally applicable to such a modification of FIG. 4.

Similar to the brush type shaft digitizer, the sample brushless shaft digitizers, as shown in FIG. 4, is subject to the disadvantage that two or more low reluctance teeth on separate discs may erroneously shift from a binary "1" condition to a binary "0" condition with respect to their co-operating magnetic horseshoe-shaped core devices by reason of the fact that the magnetic horseshoe-shaped devices are misaligned with respect to one another. For example, referring to FIG. 4, magnetic core devices shown symbolically as A, A1, A2 and A3 may become misaligned during operation. Because errors may occur to any order of significance, the magnitude of the error could be quite large.

This problem may be overcome in a manner now to be described. Referring to FIGS. *5a*, *5b*, *5c* and *5d*, additional magnetic core devices may be utilized for this purpose. Therein, the lowest order disc N–3 co-operates with one magnetic core device A, and each of the higher order discs N–2, N–1 and N utilizing two magnetic core devices each. Considering that each disc is rotating in the clockwise direction, indicated by the arrow and that the alignment position is represented by the vertical dotted line, disc N–2 utilizes a leading magnetic core device B1 and a lagging magnetic core device A1. Although the angular amount by which core device B1 leads an alignment position with respect to brush core device A1 co-operating with disc N–3 and the angular amount by which core device A1 lags the alignment position is not critical, it must be less than one-half the arcuate width of the low reluctance teeth with which the core devices A1 and B1 co-operate. For purposes of the disclosed embodiment of the present invention, the separation between the dual core devices co-operating with the higher order disc was selected to be equal to the width of the low reluctance teeth on the respectvie lower order disc.

In FIG. *5b*, core devices A1 and B1 are shown separated in lagging and leading relationship to the alignment position by equal amounts and separated by 22.5°. Likewise, core devices A2 and B2 are placed to co-operate with disc N–1 in lagging and leading relationship with respect to the alignment position by equal amounts and are separated by 45°. Finally, core devices A3 and B3 are placed to co-operate with disc N in lagging and leading relationship with respect to the alignment position by equal amounts and are separated by 90°.

In order to provide a non-ambiguous readout by the utilization of the dual leading and lagging core devices co-operating with the higher order discs, N–2, N–1 and N, the binary condition read from the next lower order disc is determined and used to make the selection of either of the leading or lagging core devices. By way of illustration, if the binary condition read from the core device A co-operating with disc N–3 is equal to a binary "0," the lagging core device A1 co-operating with the disc N–2 is read. However, if the binary condition read from the core device A co-operating with disc N–3 is equal to a binary "1," the leading core device B1 co-operating with disc N–2 is read.

Similarly, if the selected core device A1 or B1 co-operating with disc N–2 provides an output commensurate with a binary "0" the lagging core device A2 of disc N–1 is read. However, if the selected core device A1 or B1 provides an output commensurate with a binary "1" the leading core device co-operating with disc N–1 is read. Likewise, if the selected core device A2 or B2 provides an output equal to a binary "0," the lagging core device A3 of disc N–1 is read. On the other hand, if the selected core device A2 or B2 provides an output equal to a binary "1," the leading core device B3 of disc N is read. By utilizing such a technique for sampling the core devices co-operating with the plural discs each representing a binary order of significance, any minor misalignment of the core devices will not cause an error during the time required for interrogation thereof.

Referring now to FIG. 6, there is shown an electrical block diagram showing electrical logic circuitry which will provide for the required selection of leading or lagging core devices in accordance with the binary information read out of the next lower order core device. Therein, core devices A, A1, B1, A2, B2, A3 and B3 are shown in diagrammatic form. Passing through the aperture 5 of each of these core devices is one primer winding 8 which is grounded at one terminal. At appropriate times, a primer pulse may be applied to the other terminal to serially prime each core device in accordance with its magnetic flux condition, as discussed hereinabove in connection with FIGS. *1a*, *1b*, *1c* and *1d*. Likewise, the aperture 5 of each of the core devices has a single driver winding 9 passing serially therethrough in the other direction. One terminal of driver winding 9 is grounded. A driver pulse may then be applied to the other terminal to simultaneously interrogate each core device, as described hereinabove. It should be noted that the primer winding 8 and the driver winding 9 pass through the aperture in different directions. Each core device A, A1, B1, A2, B2, A3 and B3 is provided with a separate sense winding 10 in order to detect the binary condition of its respective core each time the driver winding is pulsed.

In order to provide the non-ambiguous readout technique described above, logic circuitry is connected to each sense winding utilizing several standard logic components which are shown in symbolic form in FIGS. *7a*, *7b*, *7c* and *7d*. In FIG. *7a*, there is shown the symbol for a conventional two input OR circuit which, considering negative voltage mode logic (down voltage level indicating a binary "1") will provide a down voltage level at its output when either of its inputs is receiving a down voltage level. In FIG. *7b*, there is shown the symbol for a conventional two input AND circuit which, considering negative logic, will provide a down voltage level output only when both of its inputs are receiving a down voltage level. In FIG. *7c*, there is shown the symbol for a conventional inverter which will convert a down voltage level to an up voltage level or vice versa. In FIG. *7d*, there is shown a symbol for a conventional latch circuit with two input terminals labeled 1 and 0, and two output terminals labeled 1 and 0. Considering negative logic, a latch circuit in the reset condition will drive its 1 output terminal to a down voltage level from an up voltage level in response to a down voltage level input or negative going pulse at input terminal 1. Correspondingly the 0 output terminal of the latch then goes to an up voltage level from its down voltage level. The latch is then in what is defined as its set condition. Moreover, the conventional latch circuit may be driven back to a reset condition by a down input voltage or negative going pulse being applied to its 0 input terminal with the 0 output terminal going to a down voltage level and the 1 output terminal going to an up voltage level. It is emphasized that when the 0 output terminal is at a down voltage level, the 1 output terminal must be at an up voltage level and vice versa; and that the latch must be in a reset condition before the latch be driven to a set condition by low voltage level negative going pulse being applied to its 1 input terminal.

Referring again to FIG. 6, a conventional latch circuit 20 is connected to the sense winding 10 of core device A; a conventional latch 21 is connected to the sense winding 10 of core device A1; a conventional latch 22 is connected to sense winding 10 of core device B1; a conventional latch 23 is connected to the sense winding 10 of core device A2; a conventional latch 24 is connected to the sense winding 10 of core device B2; a conventional latch 25 is connected to the sense winding 10 of core device A3; and a conventional latch 26 is connected to the sense winding 10 of core device B3. Each conventional latch circuit is switched to the reset condition by application of reset pulses from a source not shown prior to the beginning of a readout time for the converter. As indicated hereinabove, a negative going pulse produced in any of the sense windings 10 will drive its corresponding latch to a set condition. Thereafter, until that latch is reset by the application of a negative going pulse to its 0 input terminal from a source not shown, the latch will remain in that set condition.

Connected to receive an input from the 1 output of latch 20 is an AND circuit 27. Also connected to the 1 output of latch 20 is an input OR circuit 28. The other input of OR circuit 28 is connected to the 0 output of latch 21. Connected to the output of OR circuit 28 is the 1 input of AND circuit 29. The other input of AND circuit 29 is connected to receive the output of AND circuit 30 which receives a 1 input from the 0 output of latch 20 and the other input from the 0 output of latch 22. The output from AND circuit 29 is connected through inverter 31 to one of the inputs of AND circuit 32. The output from inverter 31 is also connected to one of the inputs of OR circuit 34. The other input of OR circuit 34 is connected to the 0 output of latch 23. The output from OR circuit 34 is connected to one of the inputs of AND circuit 35. The other input of AND circuit 35 is connected to the output of OR circuit 36. One of the inputs of OR circuit 36 is connected to the output of AND circuit 29. The other input of OR circuit 36 is connected to the 0 output of latch 24. The output of AND circuit 35 is connected through inverter 37 to a 1 input of AND circuit 38. The output of inverter 37 is also connected to the 1 input of OR circuit 39. The other input of OR circuit 39 is connected to the 0 output of latch 25. The output of OR circuit 39 is connected to the 1 input of AND circuit 40. The other input of AND circuit 40 is connected to the output of OR circuit 41. One input of OR circuit 41 is connected to the output of AND circuit 35. The other input of OR circuit 41 is connected to the 0 output of latch 26. The output of AND circuit 40 is connected through inverter 42 to the 1 input of AND circuit 43.

Thus, considering that all of the latches 20 through 26 have been reset and the shaft 19 of FIGS. *5a, 5b, 5c* and *5d* is positioned such that the N–3 disc should provide a negative going pulse corresponding to a binary "1"; the N–2 disc is positioned such that it should provide no output commensurate with a binary "0"; the N–1 disc is positioned so it should provide a negative going pulse corresponding to a binary "1"; the N disc is positioned so that it should provide a negative going pulse commensurate with a binary "1"; the logic circuitry described hereinabove in connection with FIG. 6 should operate in the following manner.

Latch 20 will receive a negative going voltage pulse from the sense winding 10 of core device A and will be driven to a set condition so as to provide a down voltage level at its 1 terminal. The 1 output in latch 20 in turn applies a down voltage level to AND gate 27 to provide an appropriate readout commensurate with the N–3 order of significance of binary information. Following the non-ambiguous core device selection pattern described above in connection with FIGS. *5a, 5b, 5c* and *5d,* the binary "1" condition read out from core A indicated that leading core B1, co-operating with disc N–2, should be selected to determine the readout of disc N–2. To provide for this selection, the 1 output of latch 20 in the set condition applies a down voltage level to OR circuit 28, while the 0 output of latch 20 applies an up voltage level to OR circuit 30. Because an up voltage level is applied to OR circuit 30, its output voltage level is then dependent on the voltage level of the 0 output of latch 22. In contrast, the output voltage level of OR circuit 28 is made independent of the condition of latch 21 which is responsive to the non-selected core A1. Meanwhile, latch 22 connected to receive no output commensurate with a binary "0" condition from selected core B1 provides a down voltage level from its 0 output terminal to the other input of OR circuit 30. The output of OR circuit 30 follows its lowest input voltage level which applies a down voltage input to AND circuit 29. Since AND circuit 29 is receiving a down voltage level at its two inputs, a down voltage level output is applied to the input of inverter 31 to provide an up voltage level to AND circuit 32 in accordance with the desired binary "0" readout from disc N–2 and core B1.

Based on the exemplary binary "0" readout from disc-N–2 via core B1, lagging core A2 co-operating with disc N–1 should be selected. To provide this selection, the Down voltage level at the input of inverter 31 is applied to one input of OR circuit 36 and the up input voltage level at the output of inverter 31 is applied to one input of OR circuit 34. Because a high voltage level is applied to OR circuit 34, its output voltage level is then dependent on the voltage level of the output of latch 23 which is in turn connected to be responsive to core A2. In contrast, the output voltage level of OR circuit 36 is made independent of the condition of latch 24 which corresponds to the non-selected core B2. Since a binary "1" condition is present in core A2 according to the present example, a negative going pulse is supplied to drive latch 23 to its set condition with its 0 output terminal going to an Up voltage level. As a result, the output of OR circuit 34 is up so as to cause the output of AND circuit 35 to also be at an up voltage level. As a result, the up voltage level at the output of AND circuit 35 is transmitted through inverter 37 so as to apply a down voltage level to AND circuit 38 corresponding to an exemplary binary "1" condition readout at selected core A2.

Based on a binary "1" being read from dis N–1 through core A2, a non-ambiguous readout requires that leading core B3 co-operating with disc N be selected to provide the N order binary output information. For this purpose, the up voltage level input of inverter 37 is applied to OR circuit 41, while the down voltage level in the output of inverter 37 is applied to one input of OR circuit 39. As a result, the up voltage level input to OR circuit 41 makes the output of OR circuit 41 responsive to the binary condition of core B3, whereas, the down voltage level input to OR circuit 39 renders the output voltage level of that OR circuit non-responsive to the binary condition existing in core A3. Thus, the binary condition of core B3 is selected for interrogation. Because, according to the present example, core B3 is leading a binary "1" from disc N, a negative going pulse applied to the one input terminal of latch 26 will place it in a set condition with its 0 output terminal going to an up voltage level. As a result, the output of OR circuit 41 is at an up voltage level and AND circuit 40 has an up voltage level in its output. The output of inverter 42 is then down so as to apply a down voltage level to AND circuit 43 corresponding to a binary "1" being lead out from disc N.

In summary and based upon the present example, AND circuit 27 is receiving a down voltage level input corresponding to a binary "1" for the N–3 order of significance of the desired electrical binary output signal; AND circuit 32 is receiving an Up voltage level input corresponding to a binary "0" for the N–2 order of significance of the desired electrical binary output signal; AND circuit 32 is receiving an up voltage level input corresponding to a binary "1" for the N–1 order of significance of the desired electrical binary output signal; and AND circuit 43 is receiving a down voltage level input corresponding to a binary "1" for the N order of significance of the desired electrical binary output signal. If it is desired that each of these AND circuits 27, 32, 38 and 43 provide a parallel readout, a negative going voltage pulse functioning as a clock pulse may be similarly applied to the other input of each of these AND gates. As a result, the outputs of each of these gates will provide a negative going pulse in parallel in accordance with the binary condition which it is desired to represent. However, if a serial electrical binary output is desired from AND gates 27, 32, 38 and 43, the negative going clock pulses applied to the other input of these AND circuits should be successive commencing with AND circuit 27.

Numerous modifications may be made to the structure of the core device 1 and its use for detecting whether or not a low reluctance means is in bridging relationship with two of its leg portions by those skilled in the art without departing from the teachings of the present invention. For example, the core device may have a shape other than that of a horseshoe as shown and determined by the particular design requirements of its practical application. In addition, the premagnetization magnetomotive force is shown in the disclosed embodiment as comprising a winding on one of the leg portions of the core device. However, it should be clear that this source of magnetomotive force could be placed anywhere in the flux path comprising the core and low reluctance armature means and may be of the permanent magnet type rather than of the electromagnet type.

Even though an air gap has been utilized herein as providing a high reluctance when it is desired not to bridge two leg portions of the core device, it should be obvious that this air gap could have been replaced in total or in part by a high reluctance material. For example, a high reluctance material such as aluminum might be used for this purpose when the design requirements are dependent upon additional mechanical strength. Furthermore, the armature or bridging means could be stationary while the core device or core devices operating therewith are the moving or rotation parts.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic detecting means comprising a core device of a square loop magnetizable material having two leg portions, an aperture in said core device, low reluctance armature means which may be positioned to either bridge or not bridge said two leg portions, a source of magnetomotive force within the main low reluctance path comprising said core device and said armature means and inductive sampling means passing through said aperture for providing an induced output voltage when said two leg portions are not bridged and no induced output voltage when said two leg portions are bridged, said inductive sampling means comprising energizing winding means and sensing winding means, said sensing winding means having an output voltage induced thereon only when said energizing winding means is sufficient to reverse magnetic flux around said aperture.

2. A magnetic analog position to binary digital electrical information converter comprising a core device of a square loop magnetizable material having two leg portions, an aperture in said core device, a low reluctance armature means which may be positioned to either bridge or not bridge said two leg portions, a source of magnetomotive force within the low reluctance magnetic flux path comprising said core device and said armature means, means for positioning said armature means in accordance with the analog position to be converted and inductive sampling means passing through said aperture for providing an induced output voltage when said two leg portions are not bridged representing one binary condition and no induced voltage when said two leg portions are bridged representing the other binary condition, said inductive sampling means comprising energizing winding means and sensing winding means, said sensing winding means having an output voltage induced thereon only when said energizing winding means is sufficient to reverse magnetic flux around said aperture.

3. A magnetic detecting means comprising a horseshoe-shaped device of a square loop magnetizable material consisting of two leg portions and a connecting member; an aperture in said connecting member; a first, second and third winding passing through said aperture; first winding means for providing a negative going magnetizing force around said aperture; second winding means for providing a positive going magnetizing force around said aperture; means for saturating the flux path around said horseshoe-shaped device including the placing of a low reluctance armature means in bridging relation across said leg portions; means for removing said low reluctance armature mean from its bridging relationship across said legs for causing said flux path to close back within the horseshoe-shaped device; means for applying successive current pulses to said first and second winding means for providing successive positive and negative going magnetizing forces in said horseshoe-shaped device around said aperture, thereby inducing voltages in said third winding when said low reluctance armature means is not in registry with said two legs and no induced voltage in said third winding when said low reluctance armature means is in registry with said two legs.

4. A magnetic position detecting means comprising a core device of a square loop magnetizable material having two legs portions forming an electromagnet; positioning means for bringing a low reluctance armature means in or out of registry with the two leg portions of said core device; an aperture in said core device; inductive sampling means passing through said aperture for determining whether or not said low reluctance armature means is in registry with the two leg portions of said core device, said inductive sampling means comprising energizing winding means and sensing winding means, said sensing winding means having an output voltage induced thereon only when said energizing winding means is sufficient to reverse magnetic flux around said aperture.

5. A magnetic positioning detecting means comprising a core device of a square loop magnetizable material having two leg portions forming an electromagnet; positioning means to place the low reluctance armature means in a position to either bridge or not bridge said two leg portions of said core device; an aperture in said core device; inductive sampling means passing through said aperture for determining whether or not said low reluctance armature means is bridging the two leg portions of said core device, said inductive sampling means providing an induced output voltage when said two leg portions are not bridged and no induced voltage when said two leg portions are bridged, said inductive sampling means comprising energizing winding means and sensing winding means, said sensing winding means having a output voltage induced thereon only when said energizing winding means is sufficient to reverse magnetic flux around said aperture.

6. A magnetic detection means comprising a horseshoe-shaped device of a square loop magnetizable material consisting of two open ended leg portions; an aperture in said horseshoe-shaped device; a first, second and third winding passing through said aperture; pulse means for applying a negative going magnetizing force to the horseshoe-shaped device around said aperture via said first winding; pulse means for applying a positive going magnetizing force to the horseshoe-shaped device around said aperture via said second winding; means for saturating the flux path around said horseshoe-shaped device and the armature means bridging for said open ended legs; means for removing said low reluctance armature means from its bridging relation with said open ended legs for causing said flux path to cross back within the horseshoe-shaped device; successive pulses being applied to said first and second windings for providing successive positive and negative going magnetizing forces to said horseshoe-shaped device around said aperture; successive pulses being applied to said first and second windings for providing successive positive and negative going magnetizing forces in said horseshoe-shaped device around said aperture thereby inducing voltages in said third winding when said low reluctance armature means is not bridging said two open ended legs and no induced voltage in said third winding when said low reluctance armature means is bridging said two open ended legs.

7. A magnetic position detecting means comprising a core device of a square loop magnetizable material having two leg portions, a magnetization winding wound around said core device connected to a direct current source such that said core device acts as an electromagnet; an aperture in said core device; a low reluctance armature means which may be positioned to either bridge or not bridge said leg portions of said device; inductive sampling means passing through said aperture for providing an induced output voltage when said open ends are not bridged and no induced voltage when said open ends are bridged, said inductive sampling means comprising energizing winding means and sensing winding means, said sensing winding means having an output voltage induced thereon only when said energizing winding means is sufficient to reverse magnetic flux around said aperture.

8. A magnetic analog position to binary digital electrical information converter comprising a horseshoe-shaped device of a square loop magnetizable material having two leg portions, a magnetization winding wound around said horseshoe-shaped device connected to a direct current source such that said horseshoe-shaped device acts as an electromagnet, an aperture in said horseshoe-shaped device, a low reluctance armature means which may be positioned to either bridge or not bridge said two leg portions of said horseshoe-shaped device, means for positioning said low reluctance armature means in accordance with the analog position to be converted, and inductive sampling means passing through said aperture for providing an induced output voltage when said two leg portions are not bridged representing one binary condition and no induced voltage when said leg portions are bridged representing the other binary condition, said inductive sampling means comprising energizing winding means and sensing winding means, said sensing winding means having an output voltage induced thereon only when said energizing winding means is sufficient to reverse magnetic flux around said aperture.

9. A magnetic analog position to binary digital electrical information converter comprising plural horseshoe-shaped devices of a square loop magnetizable material, each having two leg portions, a magnetization winding wound around each of said horseshoe-shaped devices which is connected to the direct current source such that each horseshoe-shaped device acts as an electromagnet, an aperture in each of said horseshoe-shaped devices, at least one low reluctance armature means corresponding to each horseshoe-shaped device which may be positioned to either bridge or not bridge said two leg portions of each horseshoe-shaped device, means for positioning said plural low reluctance armature means in accordance with the analog position to be converted, inductive sampling means passing through each of said apertures for providing an induced output voltage when said two leg portions are not bridged representing one binary condition and no induced voltage when said leg portions are bridged representing the other binary condition, said inductive sampling means comprising energizing winding means and sensing winding means, said sensing winding means having an output voltage induced thereon only when said energizing winding means is sufficient to reverse magnetic flux around said aperture, said plural low reluctance armature means and plural horseshoe-shaped devices being arranged to co-operate in accordance with the number of significant bits in the desired binary electrical output information.

10. A magnetic analog position to binary digital electrical information converter comprising plural core devices of a square loop magnetizable material, each having two leg portions, a magnetization winding wound around each of said core devices which is connected to the direct current source such that each core device acts as an electromagnet, an aperture in each of said core devices, at least one low reluctance armature means corresponding to each core device which may be positioned to either bridge or not bridge said two leg portions of each core device, means for positioning said plural low reluctance armature means in accordance with the analog position to be converted, inductive sampling means passing through each of said apertures for providing an induced output voltage when said two leg portions are not bridged representing one binary condition and no induced voltage when said leg portions are bridged representing the other binary condition, said inductive sampling means comprising energizing winding means and sensing winding means, said sensing winding means having an output voltage induced thereon only when said energizing winding means is sufficient to reverse magnetic flux around said aperture, said plural low reluctance armature means and plural core devices being arranged to co-operate in accordance with the number of significant bits in the desired binary electrical output information.

11. A magnetic analog position to binary digital electrical information converter comprising plural core devices of a square loop magnetizable material, each having two leg portions, a magnetization winding wound around each of said core devices which is connected to the direct current source such that each core device acts as an electromagnet, an aperture in each of said core devices, at least one low retluctance armature means corresponding to each core device which may be positioned to either bridge or not bridge said two leg portions of each core device, shaft means for angularly positioning said plural low reluctance armature means in accordance with the analog shaft position to be converted, inductive sampling means passing through each of said apertures for providing an induced output voltage when said two leg portions are not bridged representing one binary condition and no induced voltage when said leg portions are bridged representing the other binary condition, said inductive sampling means comprising energizing winding means and sensing winding means, said sensing winding means having an output voltage induced thereon only when said energizing winding means is sufficient to reverse magnetic flux around said aperture, said plural low reluctance armature means and plural core devices being arranged to co-operate in accordance with the number of significant bits in the desired binary electrical output information.

12. A magnetic analog shaft position to binary electrical information converter comprising a shaft which may be angularly positioned in accordance with an analog quantity; plural low reluctance armature means mounted along said shaft with the number of low reluctance armature means corresponding to the number of digital orders of significance desired in the binary electrical output information; said low reluctance armature means for the highest order of significance comprising a disc having a single low reluctance tooth disposed around 180° of its circumference with the armature means for each succeeding lower order having twice as many low reluctance teeth as the next higher order armature means, each totaling 180° of its circumference; at least one horseshoe-shaped device of a square loop magnetizable material having two leg portions co-operating with each low reluctance armature means; a magnetization winding wound around each of said horseshoe-shaped devices connected to a direct current source such that said core device acts as an electromagnet; an aperture in each of said horseshoe-shaped devices; inductive sampling means passing through each of said apertures for providing an induced output voltage when its two leg portions are not bridged by a co-operating low reluctance tooth and no induced voltage when its two leg portions are bridged by a co-operating low reluctance tooth; said inductive sampling means comprising energizing winding means and sensing winding means, said sensing winding means having an output voltage induced thereon only when said energizing winding means is sufficient to reverse magnetic flux around said aperture, the existence or absence of induced voltages in said inductive sampling means providing a binary coded representation of the instantaneous angular position of said shaft.

13. A magnetic analog shaft position to binary electrical information converter comprising a shaft which may be angularly positioned in accordance with an analog quantity; plural low reluctance armature means mounted along said shaft with the number of low reluctance armature means corresponding to the number of digital orders of significance desired in the binary electrical output information; said low reluctance armature means for the highest order of significance comprising a disc having a single low reluctance tooth disposed around 180° of its circumference with the armature means for each succeeding lower order having twice as many low reluctance teeth as the next higher order armature means, each totaling 180° of its circumference; at least one core device of a square loop magnetizable material having two leg portions co-operating with each low reluctance armature means; a magnetization winding wound around each of said core devices connected to a direct current source such that said core device acts as an electromagnet; an aperture in each of said core devices; inductive sampling means passing through each of said apertures for providing an induced output voltage when its two leg portions are not bridged by a co-operating low reluctance tooth and no induced voltage when its two leg portions are bridged by a co-operating low reluctance tooth; said inductive sampling means comprising energizing winding means and sensing winding means, said sensing winding means having an output voltage induced thereon only when said energizing winding means is sufficient to reverse magnetic flux around said aperture, the existence or absence of induced voltages in said inductive sampling means providing a binary coded representation of the instantaneous angular position of said shaft.

14. A magnetic analog shaft position to binary electrical information converter comprising a shaft which may be angularly positioned in accordance with an analog quantity; plural low reluctance armature means mounted along said shaft with the number of low reluctance armature means corresponding to the number of digital orders of significance desired in the binary electrical output information; said low reluctance armature means for the highest order of significance comprising a disc having a single low reluctance tooth disposed around 180° of circumference with the armature means for each succeeding lower order of significance having twice as many low reluctance teeth as the next higher order armature means, each totaling 180° of circumference; one horseshoe-shaped device of a square loop magnetizable material having two leg portions co-operating with the high order reluctance armature means; two horseshoe-shaped devices of a square loop magnetizable material having two leg portions co-operating with the low reluctance armature means corresponding to each digital order of significance; a magnetization winding wound on each of said horseshoe-shaped devices connected to a direct current source such that said horseshoe-shaped device acts as an electromagnet; an aperture in each of said horseshoe-shaped devices; inductive sampling means passing through each of said apertures for providing an induced output voltage when its two leg portions are not bridged by a co-operating low reluctance tooth and no induced voltage when its two leg portions are bridged by a co-operating low reluctance tooth; said inductive sampling means comprising energizing winding means and sensing winding means, said sensing winding means having an output voltage induced thereon only when said energizing winding means is sufficient to reverse magnetic flux around said aperture, the existence or absence of induced voltages in said inductive sampling means providing a binary coded representation of the instantaneous angular position of said shaft.

15. A magnetic analog shaft position to binary electrical information converter comprising a shaft which may be angularly positioned in accordance with an analog quantity; plural low reluctance armature means mounted along said shaft with the number of low reluctance armature means corresponding to the number of digital orders of significance desired in the binary electrical output information; said low reluctance armature means for the highest order of significance comprising a disc having a single low reluctance tooth disposed around 180° of circumference with the armature means for each succeeding lower order of significance having twice as many low reluctance teeth as the next higher order armature means, each totaling 180° of circumference; one core device of a square loop magnetizable material having two leg portions co-operating with the high order reluctance armature means; two core devices of a square loop magnetizable material having two leg portions co-operating with the low reluctance armature means corresponding to each digital order of significance; a magnetization winding wound on each of said core devices connected to a direct current source such that said core device acts as an electromagnet; an aperture in each of said core devices; inductive sampling means passing through each of said apertures for providing an induced output voltage when its two leg portions are not bridged by a co-operating low reluctance tooth and no induced voltage when its two leg portions are bridged by a co-operating low reluctance tooth; said inductive sampling means comprising energizing winding means and sensing winding means, said sensing winding means having an output voltage induced thereon only when said energizing winding means is sufficient to reverse magnetic flux around said aperture, the existence or absence of induced voltages in said inductive sampling means providing a binary coded representation of the instantaneous angular position of said shaft.

References Cited in the file of this patent

UNITED STATES PATENTS

| | | |
|---|---|---|
| 2,830,207 | Clark | Apr. 8, 1958 |
| 2,875,432 | Markow | Feb. 24, 1959 |
| 2,909,717 | Hulls | Oct. 20, 1959 |

FOREIGN PATENTS

| | | |
|---|---|---|
| 881,089 | Germany | June 25, 1953 |